US007689231B2

(12) United States Patent
Mardiks et al.

(10) Patent No.: US 7,689,231 B2
(45) Date of Patent: Mar. 30, 2010

(54) TERRITORIAL ENFORCEMENT OF DEVICE FUNCTIONALITY

(75) Inventors: Eitan Mardiks, Ra'Anana (IL); Itzhak Pomerantz, Kefar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 439 days.

(21) Appl. No.: 11/582,322

(22) Filed: Oct. 18, 2006

(65) Prior Publication Data
US 2007/0270167 A1 Nov. 22, 2007

Related U.S. Application Data

(60) Provisional application No. 60/747,417, filed on May 17, 2006.

(51) Int. Cl.
*H04W 4/02* (2006.01)
(52) U.S. Cl. ............... 455/456.4; 455/410; 455/411; 455/418; 455/419; 455/420; 455/558; 340/3.1; 340/5.2; 340/5.3; 340/5.31; 340/541; 340/572.1
(58) Field of Classification Search ............. 455/456.4, 455/418, 419, 420, 410, 411, 558; 340/3.1, 340/5.2, 5.3, 5.31, 5.8, 541, 572.1; 320/112
See application file for complete search history.

(56) References Cited

U.S. PATENT DOCUMENTS

| 5,699,685 | A  | * | 12/1997 | Jahrsetz et al. | ............... | 70/264 |
| 7,209,705 | B2 | * | 4/2007  | Moles et al.    | ............... | 455/41.2 |
| 2005/0030384 | A1 | * | 2/2005  | Lee et al.  | ............... | 348/207.99 |
| 2005/0181808 | A1 | * | 8/2005  | Vaudreuil   | ............... | 455/456.3 |
| 2006/0099965 | A1 | * | 5/2006  | Aaron       | ............... | 455/456.3 |

* cited by examiner

*Primary Examiner*—Dwayne Bost
*Assistant Examiner*—Christopher Henry
(74) *Attorney, Agent, or Firm*—Brinks Hofer Gilson & Lione (57) ABSTRACT

The present invention discloses an enforcement system for controlling security in a territory including: (a) a multifunctional device having a plurality of device functionalities; (b) a disabling mechanism for reversibly disabling at least one device functionality; and (c) a gate controller, for enforcing security in the territory, having a restricting mechanism for activating the disabling mechanism. A method for controlling device functionalities of a device in a territory including the steps of: (a) sending a disable instruction to the device to disable at least one device functionality upon entry of the device into the territory; and (b) disabling at least one device functionality, by the device, upon receipt by the device of the disable instruction.

12 Claims, 5 Drawing Sheets

TERRITORIAL ENFORCEMENT OF DEVICE FUNCTIONALITY

This patent application claims the benefit of U.S. Provisional Patent Application No. 60/747,417 filed May 17, 2006.

FIELD AND BACKGROUND OF THE INVENTION

The present invention relates to systems and methods for selectively enforcing a temporary limitation on the use of certain functions of a portable device for the period that the device is within a specific territory.

People have grown accustomed to taking mobile phones with them almost everywhere they go. Modern mobile phones are becoming multi-functional devices which may include: a voice recorder, a still camera, a video camera, a portable data storage device, and a global-positioning system.

There are many territories (i.e. designated regions) where a local authority forbids the use of one or more of the functions mentioned above for reasons of security, safety, or commercial interest. A method in the prior art of deterring the use of such device functions is to forbid visitors to carry a mobile phone into the territory. Indeed, there are places where one is not allowed to enter with a mobile phone. Such a method deprives the visitor of the legitimate use of the mobile phone for answering calls, and also creates a risk of theft or loss of the mobile phone in cases where the device is left with a gatekeeper.

Another deterrence method in the prior art is to instruct visitors not to use these particular functions. In doing so, one relies solely on the visitor's cooperation for compliance. Thus, such a method is not reliable since visitors may, intentionally or unintentionally, use one of the forbidden device functions.

It would be desirable to have systems and methods for enforcing limitations on the functionality of portable devices in a designated territory, without the drawbacks of the prior art methods.

SUMMARY OF THE INVENTION

It is the purpose of the present invention to provide systems and methods for selectively enforcing a temporary limitation on the use of certain functions of a portable device for the period that the device is within a specific territory.

For the purpose of clarity, several terms which follow are specifically defined for use within the context of this application. The term "territory" is used in this application to refer to a physical area, such as a military base, hospital, theater, or airplane that is accessible to guests only through secured entry points, and that can have restrictions on behavior set by a local authority. The term "ring-tone functionality" is used in this application to refer to a functionality enabling to selection of unique ring tones for various functions of a mobile phone. For example, different ring tones for incoming calls from specific callers. The term "directly" is used in this application to refer to a communication link that is established without an intermediary.

In a preferred embodiment of the present invention, the device is a mobile phone where certain functions of the device can be controlled by the SIM (i.e. subscriber identify module) card of the mobile phone. The SIM card, in turn, is remotely controlled by a MNO (i.e. mobile network operator). In this embodiment, a "restricted" territory, in which some functions of a mobile phone (such as a camera) should be prohibited from use, has one or more discrete and controlled entry points, or gates. When a visitor attempts to enter the premises via one of the gates, the gatekeeper asks to see the visitor's mobile phone. If the mobile phone has a component that should not be operational within the premises, the gatekeeper initiates a process that causes the prohibited function to be disabled on the specific phone as long as the visitor is on the premises.

In another preferred embodiment of the present invention, the device (e.g. a mobile phone) is configured to disable the prohibited functions via an instruction from the SIM card. As the SIM card is controlled by the MNO, the prohibited functions can be disabled and enabled by the MNO, in coordination with an authority of the visited premises. The service of disabling and enabling the device offered by the MNO to the hosting premises does not rely on human trust.

The enabling command can be secured by using a "key" so that only the entity that disabled the device is able to re-enable the device. This ensures that if a function in the phone was disabled upon entrance to a certain secure territory, the function will be only enabled by an authorized entity of the same territory, not by the user of the device, the MNO, or some other third party. If the SIM card or the device has direct communication with a server of the hosting territory, the disabling and enabling commands can be communicated directly to the SIM card or the device, without going through the MNO as an intermediary.

Therefore, according to the present invention, there is provided for the first time an enforcement system for controlling security in a territory, the system including: (a) a multifunctional device having a plurality of device functionalities; (b) a disabling mechanism for reversibly disabling at least one device functionality; and (c) a gate controller, for enforcing security in the territory, having a restricting mechanism for activating the disabling mechanism.

Preferably, the device is a mobile phone.

Preferably, at least one device functionality includes a camera functionality.

Preferably, at least one device functionality includes an audio-recorder functionality.

Preferably, at least one device functionality includes a wireless communication functionality.

Preferably, at least one device functionality includes a ring-tone functionality.

Preferably, the restricting mechanism communicates with the disabling mechanism via a mobile network operator.

Preferably, the restricting mechanism communicates directly with the disabling mechanism.

Preferably, the restricting mechanism is operative to activate the disabling mechanism for re-enabling at least one disabled device functionality by sending the device a message that includes a signature to be validated by the device.

More preferably, the signature is created using a private key.

Most preferably, the private key is maintained by an authority in the territory.

According to the present invention, there is provided for the first time a method for controlling device functionalities of a multifunctional device in a territory, the method including the steps of: (a) sending a disable instruction to the device to disable at least one device functionality upon entry of the device into the territory; and (b) disabling at least one device functionality, by the device, upon receipt by the device of the disable instruction.

Preferably, the disable instruction designates at least one device functionality for disabling, and wherein the disabling is performed indirectly by the device polling an internal component of the device.

Preferably, the method further includes the steps of: (c) sending an enable instruction to the device in order to re-enable at least one device functionality upon exit of the device from the territory; and (d) enabling at least one device functionality, by the device, upon receipt by the device of the enable instruction.

More preferably, the method further includes the steps of: (e) signing the enable instruction before the step of sending the enable instruction; and (f) validating a signed enable instruction for authenticity by the device.

More preferably, a private key is used for creating the signed enable instruction.

Most preferably, the step of enabling includes enabling at least one device functionality, by the device, upon receipt by the device of a valid signed enable instruction.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems and methods for selectively enforcing a temporary limitation on the use of certain functions of a portable device for the period that the device is within a specific territory. The principles and operation for territorial enforcement of device functionality, according to the present invention, may be better understood with reference to the accompanying description and the drawings.

Figure 1:
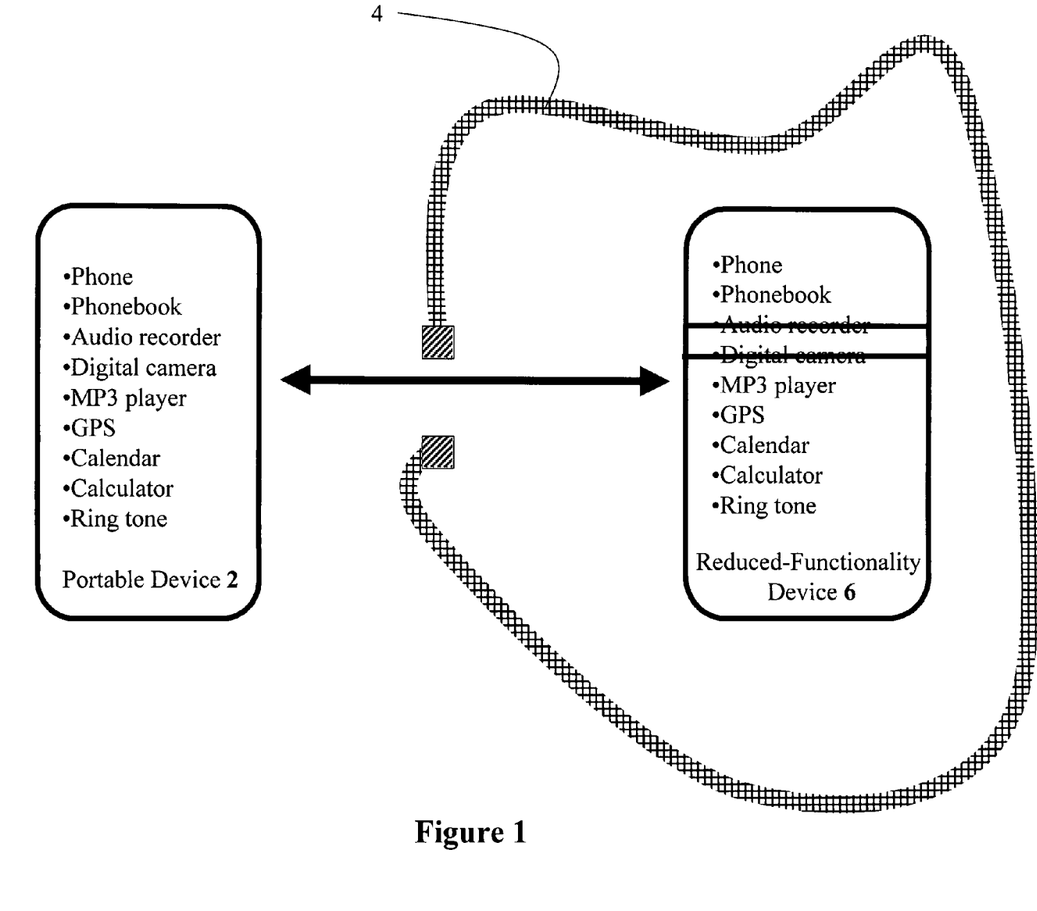
FIG. 1 illustrates portable device functionality outside and inside a restricted territory, according to a preferred embodiment of the present invention.
Figure 2A:
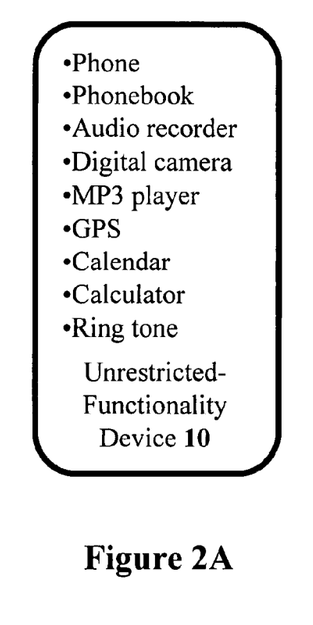
FIG. 2A illustrates the functionality of a portable device in an unrestricted territory, according to a preferred embodiment of the present invention.
Figure 2B:
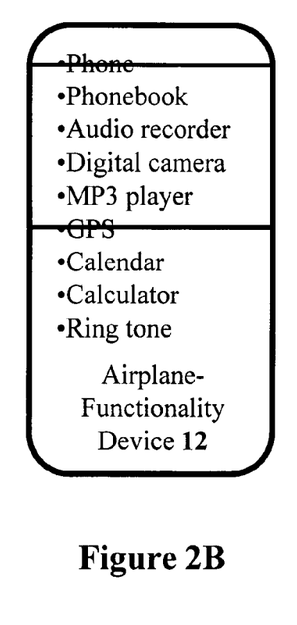
FIG. 2B illustrates the functionality of a portable device inside an airplane, according to a preferred embodiment of the present invention.
Figure 2C:
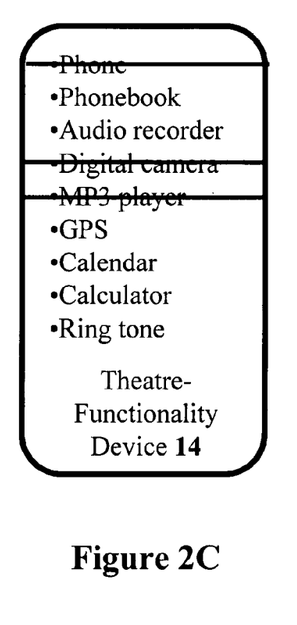
FIG. 2C illustrates the functionality of a portable device inside a theatre, according to a preferred embodiment of the present invention.
Figure 2D:
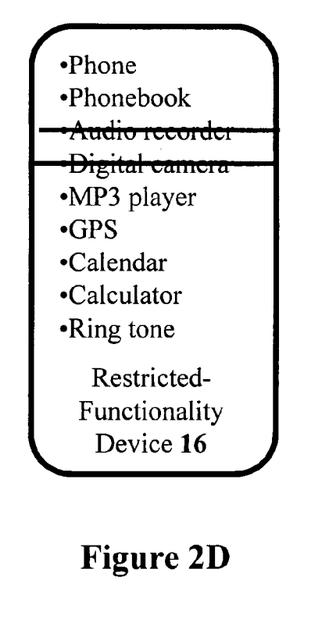
FIG. 2D illustrates the functionality of a portable device in a "secret area" territory, according to a preferred embodiment of the present invention.

Referring now to the drawings, FIG. 1 illustrates portable device functionality outside and inside a restricted territory, according to a preferred embodiment of the present invention. A portable device 2 is shown having several functions (e.g. phone, audio recorder, digital camera, GPS, and ring tone), where all of the device's functions are enabled when portable device 2 is located outside of a territory 4. Upon entering territory 4, portable device 2, which is depicted in FIG. 1 as a reduced-functionality device 6, has some device functions disabled (i.e. audio-recorder and digital-camera), preventing a user of portable device 6 from making an audio recording or taking pictures within the boundaries of territory 4. When portable device 2 is taken out of territory 4, the disabled device functions (i.e. audio-recorder and digital-camera) are re-enabled.

FIGS. 2A-D illustrates the functionality of a portable device in various typical territories, according to preferred embodiments of the present invention. FIGS. 2A-D show how the status of the functionality of a portable device can be enabled or disabled to accommodate the requirements of different types of territories. When an unrestricted-functionality device 10 (shown in FIG. 2A) is outside a controlled territory, all its functions are enabled. An airplane-functionality device 12 (shown in FIG. 2B) provides a select set of device functions when used inside an airplane. In this case, the GPS and phone functionalities are disabled. A theater-functionality device 14 (shown in FIG. 2C) limits the use of the phone, digital camera, and MP3 player when used inside a theatre. In the case of a territory that is defined as a secured confidential area, a restricted-functionality device 16 (shown in FIG. 2D) prevents the use of the audio recorder and the digital camera when used inside a "secret area".

Figure 3:
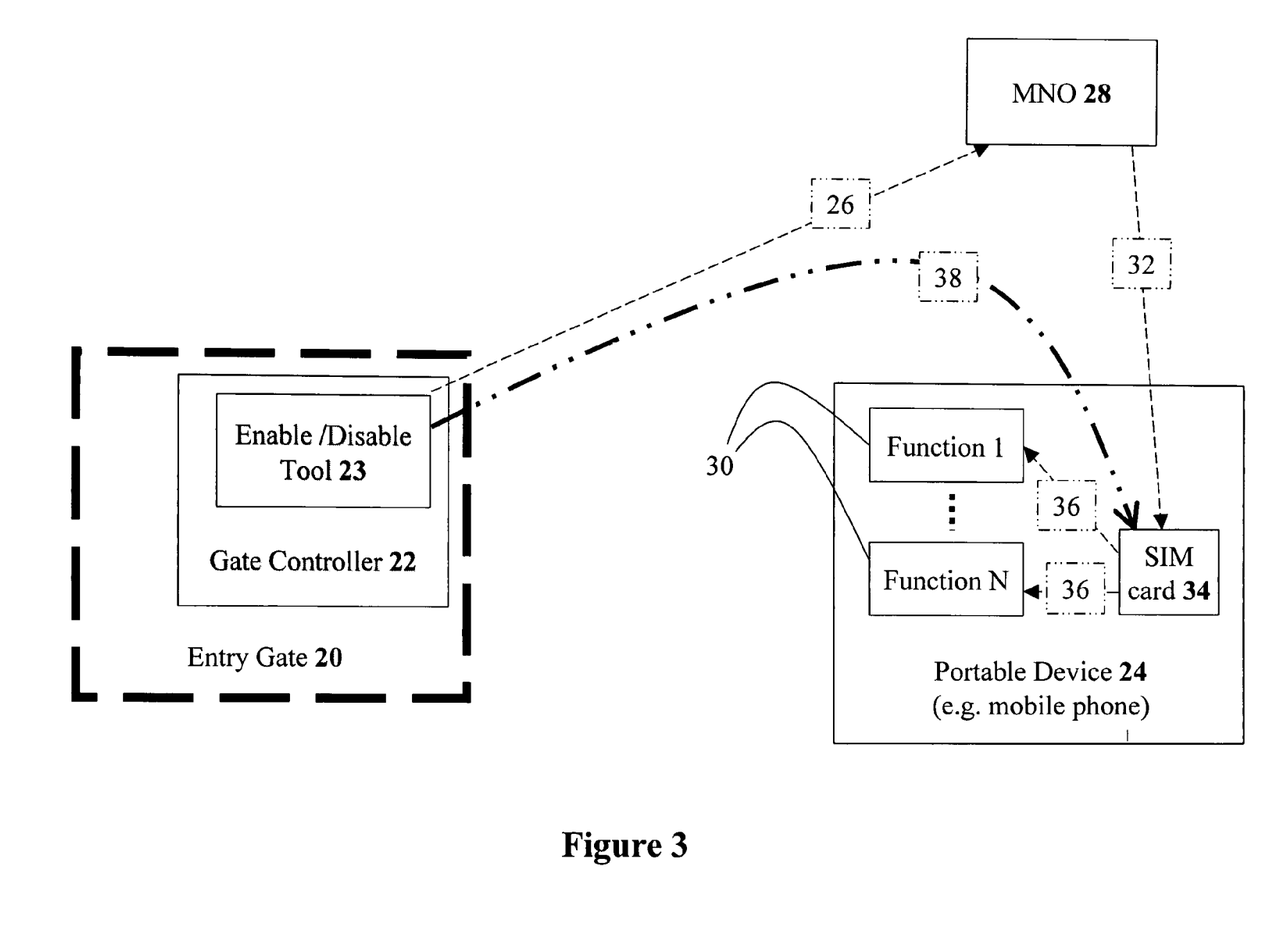
FIG. 3 is a schematic block diagram of communication options between an entry gate and a portable device, according to a preferred embodiment of the present invention.

FIG. 3 is a schematic block diagram of communication options between an entry gate and a portable device, according to a preferred embodiment of the present invention FIG. 3 shows the communication channels, at a territory entry gate 20, between a gate controller 22 and a portable device 24 (e.g. mobile phone). As soon as portable device 24 enters entry gate 20, gate controller 22 uses an enable/disable tool 23 to send a disable request 26 to an MNO 28 requesting to disable restricted functions 30. MNO 28 responds by sending a disable command 32 to a SIM card 34 of portable device 24. Upon receiving disable command 32, SIM card 34 "sends" disable instructions 36 to portable device 24 to disable restricted functions 30. In actuality, SIM card 34 is polled by portable device 24 for disable instructions 36. Alternatively, a direct communication channel 38 from gate controller 22 to SIM card 34 is implemented for controlling the functionality of portable device 24 directly without the mediation of MNO 28.

Figure 4A:
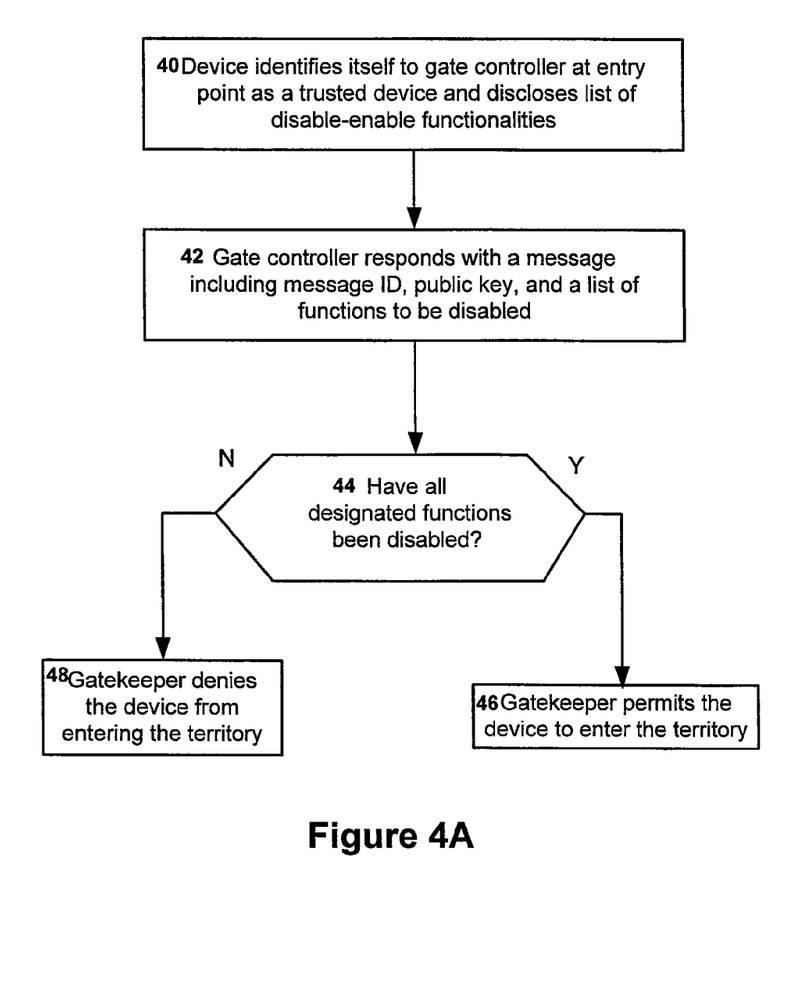
FIG. 4A is a simplified flowchart of the disabling of functionalities of a portable device, according to a preferred embodiment of the present invention.
Figure 4B:
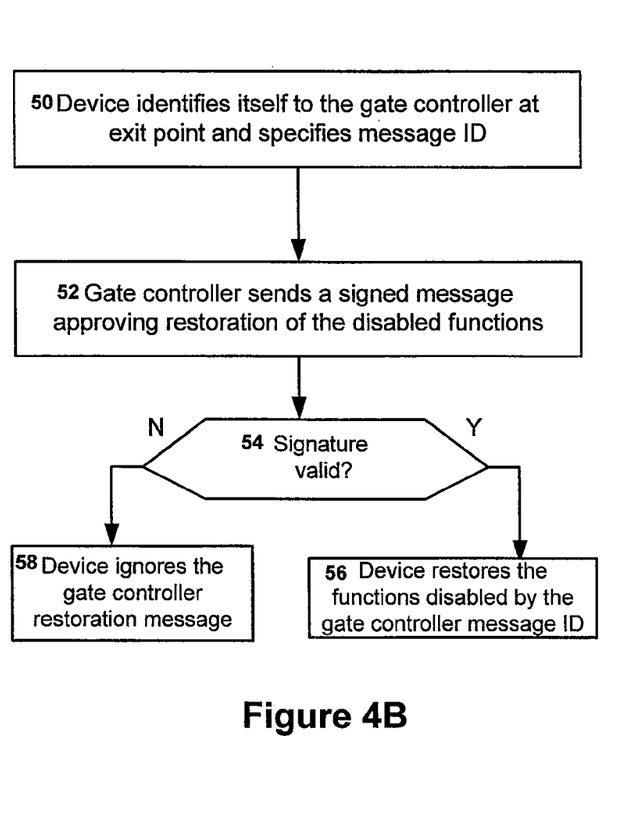
FIG. 4B is a simplified flowchart of the restoration of functionalities of a portable device, according to a preferred embodiment of the present invention.

FIG. 4A and FIG. 4B are flowcharts of embodiments of the method of the present invention in which a gate controller and a portable device communicate directly using a local system, such as a computer equipped with wireless communication technology. It is assumed that at least some functionalities of the portable device (e.g. mobile phone) are controlled by an internal component (e.g. SIM card) that is provided by a trusted entity (e.g. MNO). It is also assumed that the authority, represented by a gatekeeper that controls the physical entry of the portable device, has a way to communicate with the SIM card. While the exemplary preferred embodiments presented below assume that the gatekeeper is a person, the gatekeeper alternatively can be an automated device such as a smart turnstile. The communication method can be either direct, using a gate controller that communicates with the portable device securely, or indirect via an MNO. In the case of communication via an MNO, prior-art methods for communicating with a SIM card of a portable device, such as communication via a cellular telephony network, are used. It is further assumed that the portable device and the SIM card are trusted, and cannot be "hacked" into or tampered with by a user.

FIG. 4A is a simplified flowchart of the disabling of functionalities of a portable device, according to a preferred embodiment of the present invention. FIG. 4A shows how a functionality is disabled in such a way that a user is unable to restore the functionality without the assistance of the authority that disabled the functionality.

The process shown in FIG. 4A begins by a portable device reporting to a gate controller at an entry point to a territory that the portable device is trusted (using prior art methods such as those available from SecureGSM™, Prahran, Australia), and optionally providing a list of device functionalities (Block 40). If the gate controller decides to disable one or more of the functionalities before letting the portable device into the territory, the gate controller selects a device functionality to disable from the list, and marks the device functionality for disabling (Block 42).

The software on the gate controller also generates a message ID number, and provides the portable device with the message ID number and a public key, together with the instruction to disable the restricted functions (Block 42). The gate controller system stores the message ID number of the portable device and a record of the device functionalities that were disabled.

Optionally, a corresponding private key can be implemented for greater security. In this case, the public-key system uses encryption and decryption functions to implement two operations, namely, data encryption and signatures. The cipher text of the message can be converted back to plain text only by using the corresponding private key. Because this private key is known only by the intended recipient, only that individual can decrypt the message.

In this case, the gate controller has a private key and a public key. The gate controller uses its private key to encrypt messages to send to the portable device, and to decrypt messages received from the portable device. The portable device uses the public key to decrypt messages received from the gate controller, and to encrypt messages to send to the gate controller.

A signature is created by transforming plain text to cipher text using the private key of the gate controller. A signature is verified by attempting to transform the cipher text of the signature back to plain text. If the operation is successful, this verifies that the data encryption was done with the corresponding private key. This implies that the signature was produced by the owner of that private key.

In such a configuration, the private key is used to digitally sign the message sent by the gate controller. Upon exit, the portable device can check the signature contained in the message. This enables two or more communicating parties (e.g. multiple portable devices communicating with the gate controller within the territory) to establish confidentiality, message integrity, and user authentication. In this embodiment, the private key is maintained, either on- or off-site, with an authority for the territory. In such an implementation, instructions for device-functionality disablement upon entry into the territory (and similarly, device-functionality re-enablement upon exit from the territory) are not activated until the portable device verifies the authenticity of the message.

Upon receiving the instruction, the portable device (or more specifically, the trusted component of the portable device (e.g. a SIM card) disables the designated device functionality of the portable device, and stores the message ID number and the public key that is to be used on exit. The gate controller waits for confirmation of the disabling operation (Block 44). If the portable device sends confirmation to the gate controller indicating that the designated device functionalities have been disabled, then the gatekeeper permits the portable device to enter the territory (Block 46). If no confirmation is received by the gate controller, then the gatekeeper blocks the portable device from entering the territory (Block 48).

The embodiment described above assumes that the user of the portable device cannot circumvent the disabling operation by replacing the trusted component (e.g. SIM card), while device functionalities are disabled. This can be ensured by an information security protocol, such as the gatekeeper adhering a single-use sticker to the cover of the portable device. With such a protocol, the sticker's integrity can be checked when the user exits the territory, ensuring that the portable device was not tampered with during the visit. Alternatively, the portable device can also be configured to reject replacement of the SIM card while device functionalities are disabled. The portable device can then enter the territory and be used freely, with only some of the device functionalities disabled.

FIG. 4B is a simplified flowchart of the restoration of functionalities of a portable device, according to a preferred embodiment of the present invention. When the user wants to restore device functionalities to the portable device, typically when exiting the territory, communication is again established between the device and the gate controller. The portable device identifies itself and provides the message ID number (Block 50). The gate controller creates a restore message, digitally signs the message with the controller's corresponding private key, and sends the message to the portable device (Block 52). The portable device then verifies that the restoration message is authentic (i.e. the message was signed by the authority that issued the disabling message) (Block 54). If the restoration message is valid, the portable device restores the disabled functionalities (Block 56). If the restoration message is found to be invalid, the portable device ignores the message (Block 58).

Figure 5:
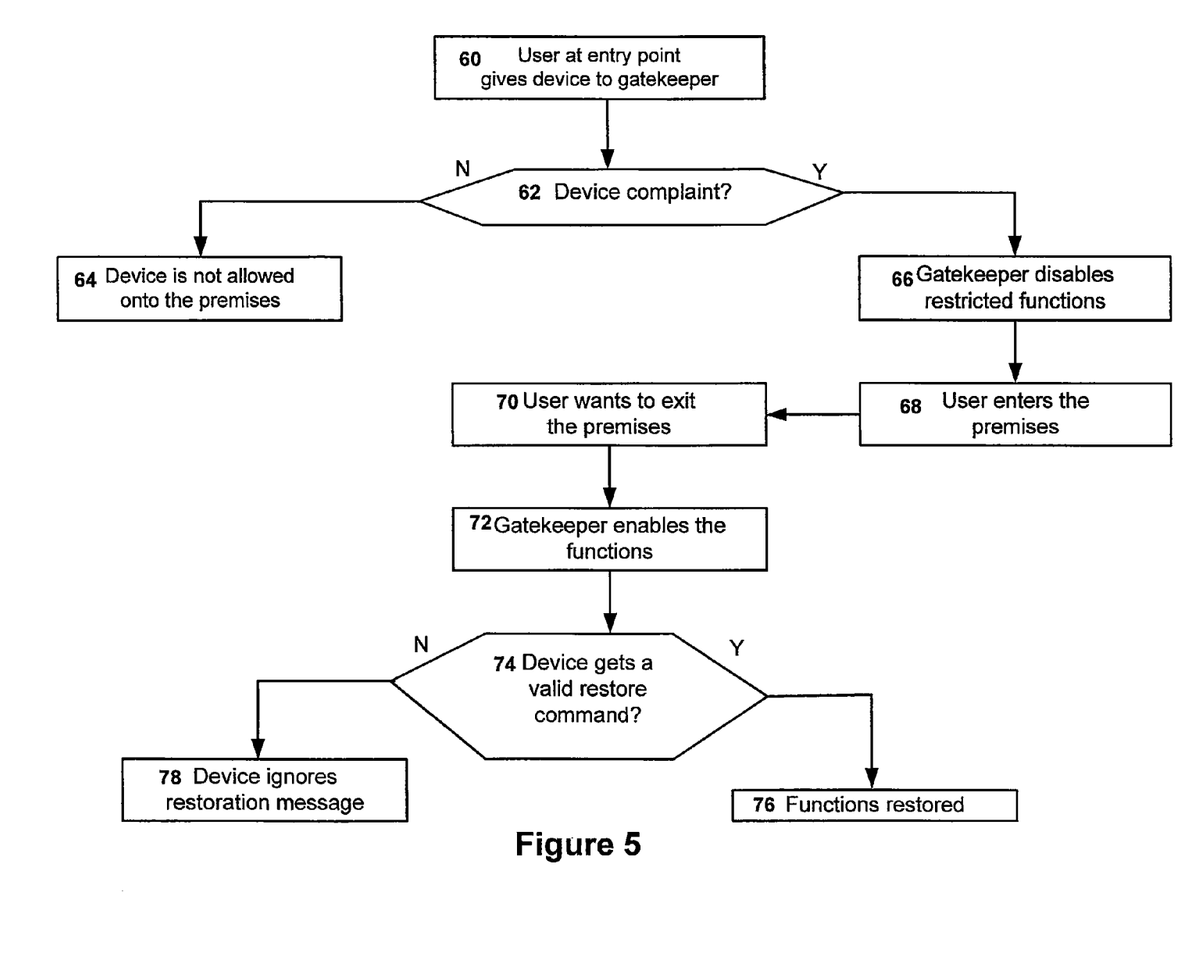
FIG. 5 is a simplified flowchart of the process of disabling a portable device at an entry point to a territory, according to a preferred embodiment of the present invention.

FIG. 5 is a simplified flowchart of the process of disabling a portable device at an entry point to a territory, according to a preferred embodiment of the present invention. FIG. 5 summarizes the process of entering and exiting a territory with a portable device from the user's point of view. A user wishes to enter a territory and gives his/her portable device to the gatekeeper for inspection (Block 60). The gatekeeper establishes communication between the portable device and the gate controller, either locally (e.g. the gatekeeper's local computer) or remotely (e.g. MNO), via a communication method (e.g. IR, short-range wireless, or MNO cellular network), and checks if the portable device is trusted (Block 62). A non-trusted device cannot be trusted to comply with the disablement of device functionalities, and is not allowed into the territory (Block 64).

The device compliance has to be between the portable device (e.g. mobile phone) and the controlling component (e.g. SIM card), and between the controlling component and the gate controller. If the portable device is found to be trusted, the gatekeeper uses his/her own judgment to decide if any of the device functionalities need to be disabled. Device functionalities that need to be disabled are then disabled as explained in FIG. 4A (Block 66). The user and the portable device are then allowed into the territory (Block 68). When the user wants to exit the territory with the portable device (Block 70), the gate controller send a restore message to the portable device to restore the disabled device functionalities as explained in FIG. 4B (Block 72). The portable device confirms that the restore message is authentic, and restores the device functionality (Block 74). If the restore message is invalid, the portable device ignores the restore message (Block 76).

While the invention has been described with respect to a limited number of embodiments, it will be appreciated that many variations, modifications, and other applications of the invention may be made.

What is claimed is:

1. A multifunctional communication device having a plurality of device functionalities and comprising a subscriber identify module (SIM) card that is operative to cause the multifunctional communication device to reversibly disable at least one of the device functionalities upon entry of the multifunctional communication device into a secured territory, wherein the multifunctional communication device is further configured to reject replacement of said SIM card while said at least one device functionality is disabled.

2. The multifunctional communication device of claim 1, wherein said multifunctional communication device is a mobile phone.

3. The multifunctional communication device of claim 1, wherein at least one said device functionality includes a camera functionality.

4. The multifunctional communication device of claim 1, wherein at least one said device functionality includes an audio-recorder functionality.

5. The multifunctional communication device of claim 1, wherein at least one said device functionality includes a wireless communication functionality.

6. The multifunctional communication device of claim 1, wherein at least one said device functionality includes a ringtone functionality.

7. A method for controlling device functionalities of a multifunctional communication device in a territory, the method comprising the steps of:
（a）upon entry of the multifunctional communication device into the territory receiving a disable instruction at a subscriber identify module (SIM) card of the multifunctional communication device to reversibly disable at least one device functionality of the multifunctional communication device
（b）reversibly disabling said at least one device functionality, by the SIM card, upon receipt by the multifunctional communication device of said disable instruction; and
（c）configuring the multifunctional communication device to reject replacement of the SIM card while said at least one device functionality is disabled.

8. The method of claim 7, wherein said disable instruction designates said at least one device functionality for disabling, and wherein said disabling is performed by the multifunctional communication device polling the SIM card of the multifunctional communication device.

9. The method of claim 7, the method further comprising the steps of:
（d）receiving an enable instruction at the multifunctional communication device in order to re-enable at least one device functionality upon exit of the multifunctional communication device from the territory; and
（e）enabling said at least one device functionality, by the SIM card, upon receipt by the multifunctional communication device of said enable instruction.

10. The method of claim 9, the method further comprising the step of:
（f）validating a signed said enable instruction for authenticity by the multifunctional telecommunication device.

11. The method of claim 10, wherein a private key is used for creating said signed enable instruction.

12. The method of claim 11, wherein said step of enabling includes enabling said at least one device functionality, by the SIM card, upon receipt by the multifunctional communication device of a valid said signed enable instruction.

* * * * *

UNITED STATES PATENT AND TRADEMARK OFFICE
CERTIFICATE OF CORRECTION

| | | |
|---|---|---|
| PATENT NO. | : 7,689,231 B2 | Page 1 of 1 |
| APPLICATION NO. | : 11/582322 | |
| DATED | : March 30, 2010 | |
| INVENTOR(S) | : Eitan Mardiks et al. | |

It is certified that error appears in the above-identified patent and that said Letters Patent is hereby corrected as shown below:

In the Claims

In column 8, claim 7, line 3, immediately after "communication device" insert --;--.

Signed and Sealed this

Eighteenth Day of May, 2010

David J. Kappos
*Director of the United States Patent and Trademark Office*